United States Patent [19]

Smith

[11] Patent Number: 5,029,408
[45] Date of Patent: Jul. 9, 1991

[54] DEER ATTRACTING DEVICE
[76] Inventor: Randy J. Smith, RR 3, Box 207A, Minot, N. Dak. 58701
[21] Appl. No.: 514,226
[22] Filed: Apr. 25, 1990
[51] Int. Cl.⁵ ............................................. A01M 31/06
[52] U.S. Cl. ............................................................ 43/1
[58] Field of Search ........................................... 43/1, 2
[56] References Cited
U.S. PATENT DOCUMENTS
3,046,192  7/1962  Bilyeu ........................................ 43/1
4,667,430  5/1987  Ziese ........................................... 43/1
4,788,787  12/1988  Konietzki ................................. 43/1
4,937,431  6/1990  Jameson ................................... 43/1

Primary Examiner—Kurt Rowan
Attorney, Agent, or Firm—Terry M. Gernstein

[57] ABSTRACT

A deer attracting apparatus includes a noise generator, a movement generator and a scent generator, all of which are operated sequentially and non-continuously to attract and hold an animal's attention and to draw that animal in a selected direction.

11 Claims, 6 Drawing Sheets

DEER ATTRACTING DEVICE

TECHNICAL FIELD OF THE INVENTION

The present invention relates to the general art of amusement devices, and to the particular field of hunting accessories.

BACKGROUND OF THE INVENTION

In certain hunting situations, particularly when the hunter is an archer, it is necessary that the hunter remain stationary in a concealed vantage point and that the target comes within range of the vantage point. In the hunting of deer, the unpredictable wanderings of the animal make it unlikely that a deer will by chance approach within about twenty-five yards of the vantage point, namely the maximum effective range of the average bow hunter.

Although teams of hunters and packs of dogs can be used to comb an area of forest and drive any surrounded deer to a waiting hunter, such techniques require considerable effort, planning and expense. Techniques for luring or decoying deer have earlier been proposed, but such techniques have often involved decoy devices of impractacally large size or weight, or have been of limited effectiveness.

Accordingly, the art has included several devices which are designed to attract deer into close proximity of a hunter. Such devices have included decoys as well as attracting features which use scent and/or visual effects.

While somewhat effective, even these devices have remained less than totally effective for several reasons. One such reason is due to the continuous and unchanging nature of the display and the attracting elements of the display. That is, the visual or scent features of the device are continuously sent forth in an unchanging pattern. A deer decoy that merely stands in one place without moving is an example of a continuous and unchanging visual effect. Even decoys that are subject to wind movement move in such constant fashion as to be considered as being unchanging.

Since animals are, by nature, skittish and prone to move about and into and out of hiding, such continuous displays are not natural. Thus, while such displays may momentarily attract attention of an animal, the artificial nature thereof will be sensed by the animal, and the animal will either be frightened off or will quickly lose interest and move on, thus defeating the desired result of the attracting device. The stationary nature of the display may also cause it to be totally overlooked and hence ignored.

A further reason for the less than totally effective results achievable using such known devices is the lack of a complete use of the animal's senses. That is, some presently available devices use visual means alone, or scent alone, or a combination of visual and scent. However, animals use all of their senses, including visual, hearing, scent and some sight to investigate an object. The lack of a means for exiting one or more of these senses may vitiate the effectiveness of an attracting device for the above-discussed reasons.

Therefore, there is a need for an apparatus for attracting game animals, such as deer, which stimulates the main senses used by such animals to detect and investigate an object, in a manner that is not likely to frighten the animal or be ignored or cause the animal to lose interest before it is attracted into range.

OBJECTS OF THE INVENTION

It is a main object of the present invention to provide an apparatus for attracting game animals.

It is another object of the present invention to provide an apparatus for attracting game animals, in particular deer.

It is another object of the present invention to provide an apparatus for attracting game animals, in particular deer, which stimulates the main senses used by such animals to detect and investigate an object.

It is another object of the present invention to provide an apparatus for attracting game animals, in particular deer, which stimulates the main senses used by such animals to detect and investigate an object, in a manner that is not likely to frighten the animal or be ignored or cause the animal to lose interest before it is attracted into range.

SUMMARY OF THE INVENTION

These, and other, objects are achieved by an animal attracting apparatus which generates a discontinuous noise, followed by a discontinuous visual display which is then followed by a scent distribution.

In this manner, all of the primary senses used by an animal to investigate an object are stimulated, and all are excited in a manner which closely simulates real conditions. Thus, the animal is not likely to be frightened off by an unnatural occurrence, nor lose interest due to a missing or ignored stimulus.

BRIEF DESCRIPTION OF THE DRAWING FIGURES

DETAILED DESCRIPTION OF THE PREFERRED EMBODIMENT OF THE INVENTION

Figure 1:
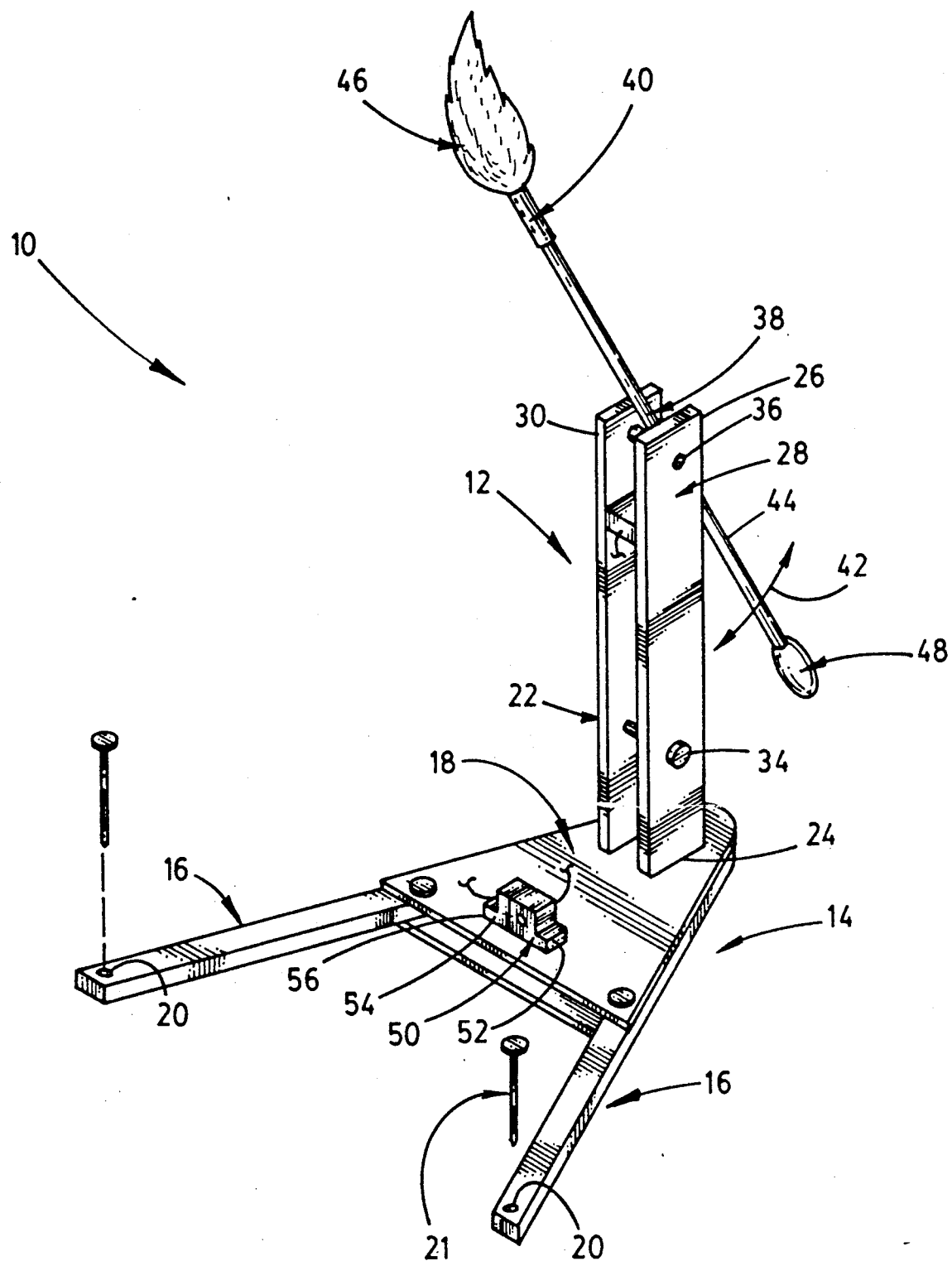
FIG. 1 is a perspective view of a deer attracting apparatus embodying the present invention.

Shown in FIG. 1 is an apparatus 10 for attracting game animals, in particular deer, into close proximity of a hunter.

The device 10 includes a frame unit 12 which is located in an area to which the deer is to be attracted, and left there to be activated from a remote location by the hunter. The frame unit 12 includes a V-shaped base 14 having two legs 16 attached together at one end of each by apex plate 18 and which have fastener-receiving holes 20 on another end thereof. A fastener, such as a nail 21 is accommodated through the holes 20 and is used to mount the frame on a tree or the like.

A support trunnion 22 is mounted at one end 24 thereof on the plate 18 to extend away from the plate to a remote end 26. The trunnion includes two elongated plate-like elements 28 and 30 that are spaced apart to define a gap therebetween. Coupling fasteners 34 and 36 connect the two elements 28 and 30 together.

The apparatus includes a visual display unit 38 which is formed by a pendulum element 40 pivotally mounted on the trunnion 22 by the coupling fastener 36 to move in the directions indicated by the double-headed arrow 42. The element 40 includes a rod 44 having a deer tail-simulating element 46 on one end thereof and a counterweight 48 on another end thereof. The coupling fastener 36 is attached to the rod near the element 46 so that the pendulum is biased into an orientation having the tail-simulating element 46 positioned upwardly as indicated in FIG. 1.

The pendulum element serves as a visual attracting unit, and the apparatus 10 also includes a noise generator unit 50 for stimulating a deer's hearing as well as a scent distributing unit 52 for exciting its sense of smell. The noise generator unit, the visual attracting unit and the scent distributing unit are all powered from a power unit 54, such as a battery pack, and are all remotely controlled and sequenced to be discontinuous using a control circuit means 56 and a controller 58 can be included as necessary. The various units are shown in FIG. 1 in block diagram form for the sake of clarity of disclosure, and are discussed and shown in greater detail below.

Figure 2:
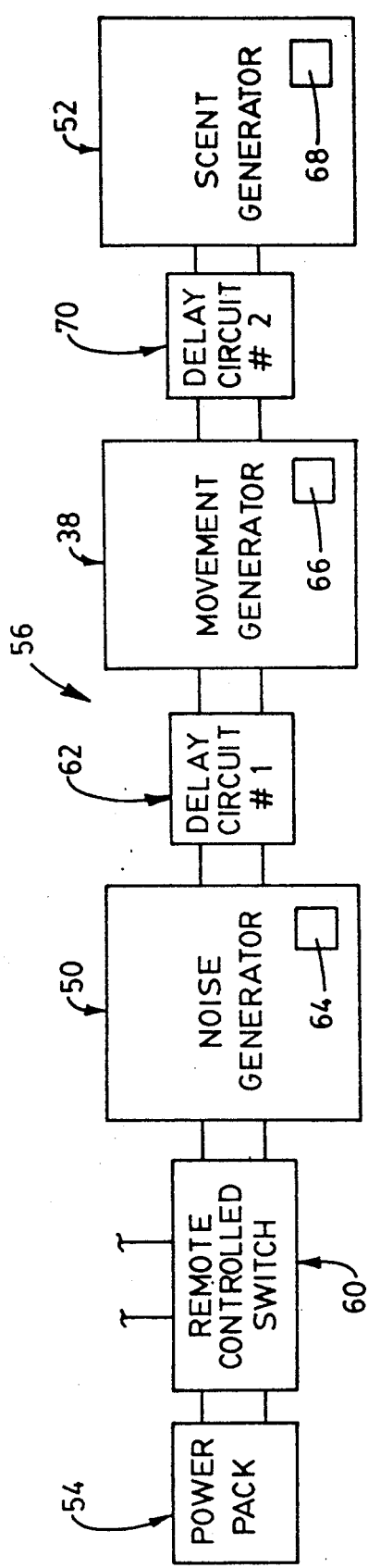
FIG. 2 is a block diagram illustrating the basic elements of the deer attracting apparatus.

The control circuit means 56 for producing the discontinuous and sequenced displays of the apparatus 10 are indicated broadly in FIG. 2.

The operation of the apparatus 10 is initiated by a remote controlled switch 60, which connects the noise generator unit 50 to the power pack 54. The noise generator unit is designed to operate for a first predetermined time period and then cease operation. When the noise generator is activated, a first delay circuit means 62 is also started. The circuit 62 is designed to delay a first preset time period and to then establish connection between the power pack and other elements, such as the movement generator unit 38 and the scent generator unit 52, after that first pre-set time interval. Until that first pre-set time interval has elapsed, no power is applied to circuit elements located beyond the first delay circuit means 62.

The noise generator unit 50 also includes a first timer circuit means 64 which shuts off the noise generator unit after the first predetermined time period which is set to be longer than the first pre-set time period so that further action occurs before the noise generator unit ceases operation.

The apparatus further includes a second delay circuit means 70 connected to the movement generator unit 38 and is started as soon as the movement generator unit is activated and delays connection of the power pack to further elements until a second pre-set time has elapsed. The second delay circuit means is similar to the first means 62, and thus will not be discussed further. The movement generator unit 38 also includes a second timer circuit means 66 which is similar to the first timer circuit means 64 and stops operation of the movement generator unit after the predetermined time has elapsed.

The scent generator unit 52 also includes a timer circuit means 68 that shuts off operation of the scent generator unit after a set period of time.

Thus, once the remote controlled switch is activated, the various generator units are activated in sequence and stopped after certain periods of operation. The various units generate the stated sense stimulating operation for certain periods of time in sequence and then cease operation so that the overall effect is changing and stimulates all of the senses used by an animal to investigate an occurrence.

Figure 3:
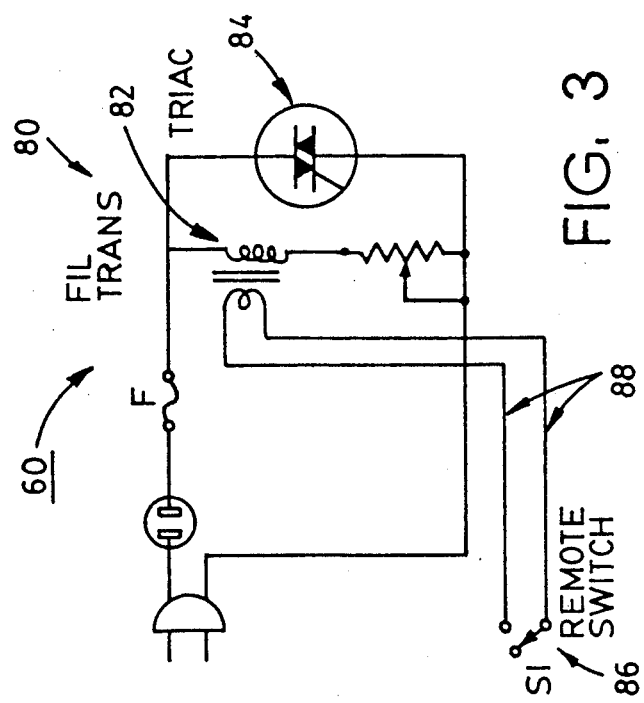
FIG. 3 is a circuit diagram of one portion of a remote controlled switch.
Figure 4:
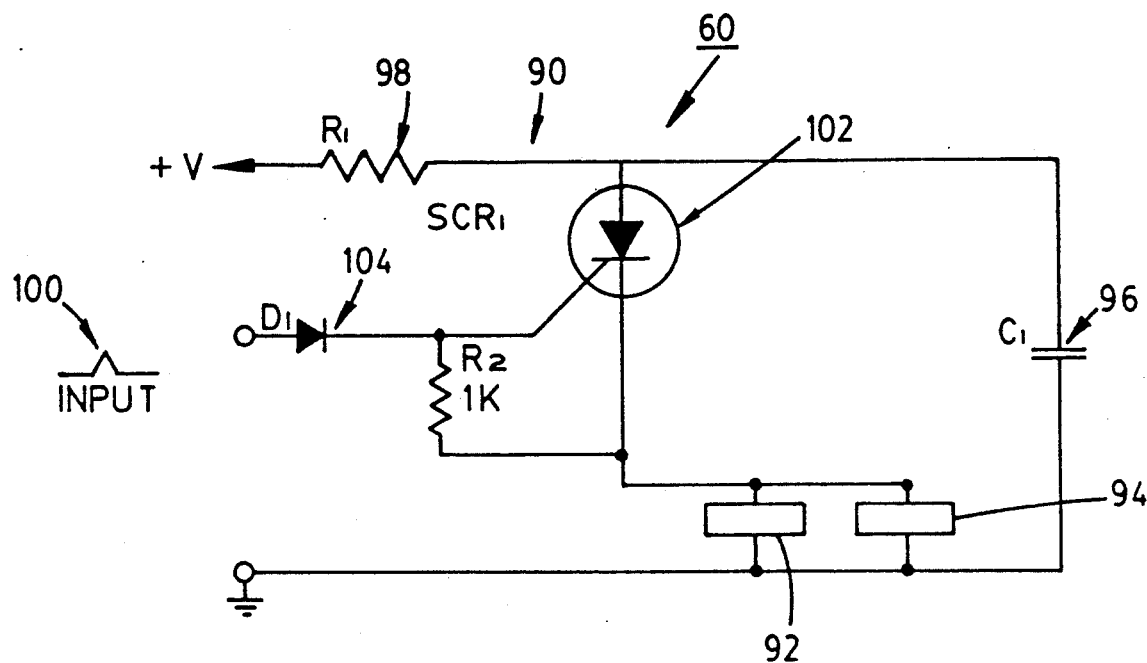
FIG. 4 is a circuit diagram of another portion of the remote controlled switch.

The remote controlled switch 50 is shown in FIGS. 3 and 4 as including a circuit 80 which provides power control without running line-voltage switch leads. The primary of a filament transformer 82 is connected between the gate and one of the main terminals of a triac 84. The secondary is connected to the remote switch 86 through a line conductor means 88. With the switch 86 open, the transformer blocks gate current and prevents the triac from firing and applying power to the noise generator unit and the other elements of the circuit 56. Closing the switch, short circuits the secondary, causing the transformer to saturate and trigger the triac.

Once the triac 84 fires, either the noise generator is activated directly, or a second portion 90 of the remote controlled switch is activated. The second portion 90 includes hold-on switches 92 and 94 that are held on once activated. These switches 92 and 94 are used to operate any of the circuit elements of the apparatus.

The second portion 90 includes a capacitor 96 that is charged though a resistor 98 for activating the switches 92 and 94. A positive pulse 100 is applied from the triac 84 to the gate of the SCR 102 that is caused to conduct discharging the capacitor 96 into the switches. With the load on the cathode circuit, the cathode immediately rises to a preset voltage as soon as the SCR 102 is triggered on. Diode 104 decouples the gate from the gate trigger source, allowing the gate to rise in potential along with the cathode so that the negative gate-to-cathode voltage is not exceeded. After the capacitor 96 is discharged, the SCR automatically turns off to allow the capacitor to recharge.

Figure 5:
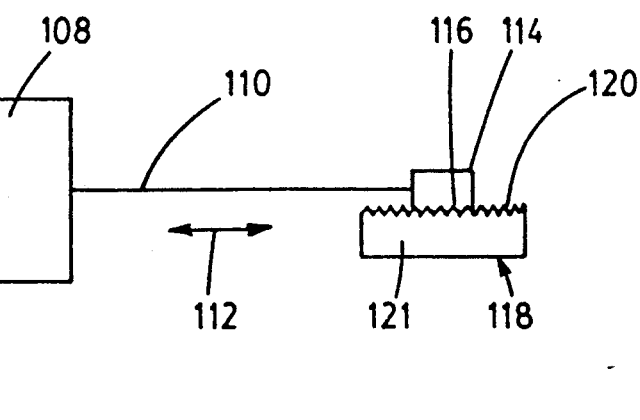
FIG. 5 is a block diagram illustrating a noise generator unit.

Once the remote controlled switch is activated, the noise generator unit 50 is activated. This noise generator unit 50 includes a sounding unit 106, best shown in FIG. 5. The sounding unit 106 includes a spring-loaded solenoid element 108 that has a solenoid rod 110. The solenoid element 108 is of the type that moves the rod one way when power is applied thereto and then moves the rod in the opposite direction when power is removed from the unit. Movement of the rod is in direction indicated by the double-headed arrow 112. A scraper element 114 attached thereto for movement therewith in the directions 112. The scraper element 114 has knurling 116 on one side thereof. The unit 106 also includes a sounding board element 118 that includes a knurled surface 120 and a resonating chamber 121 that amplifies the sounds generated when the scraper element is pulled back and forth across the knurled surface 120.

Figure 6:
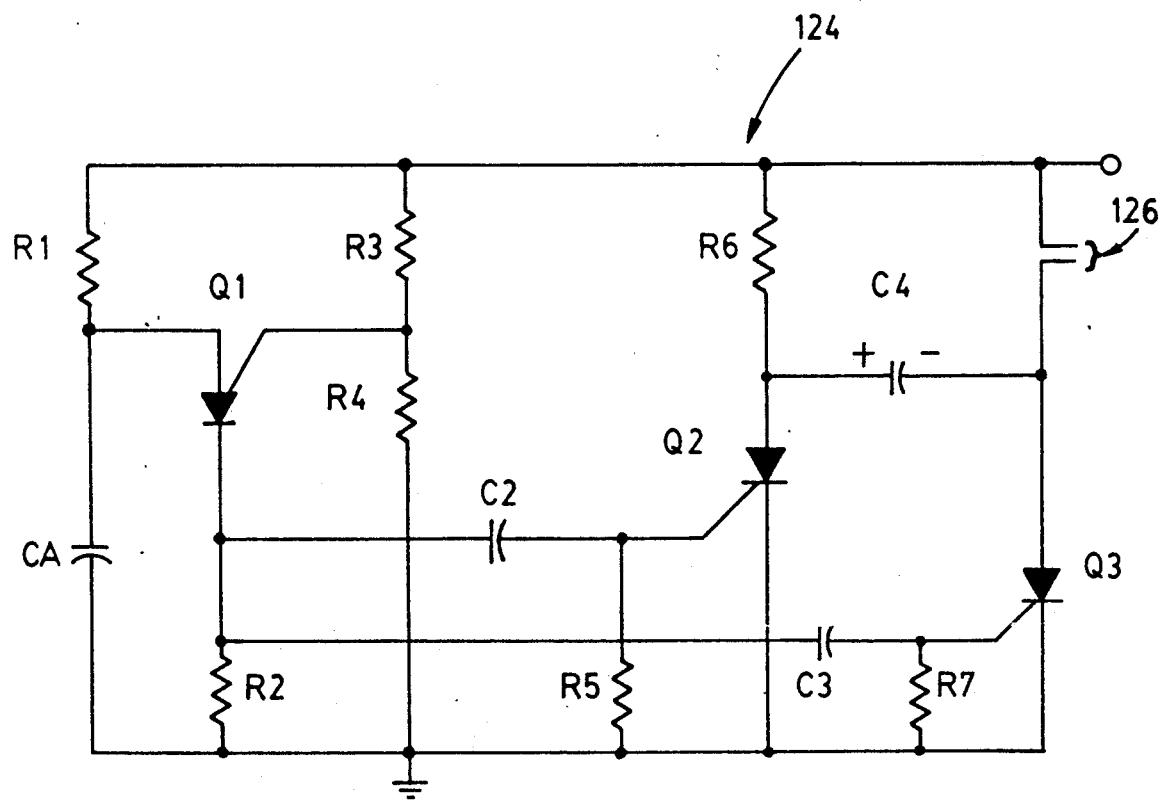
FIG. 6 is a circuit diagram of a timer circuit.

In order to force the solenoid to activate and de-activate to move the scraper back and forth, power is alternately applied and removed from the solenoid by a circuit 124 shown in FIG. 6. The circuit 124 includes a relaxation oscillator formed by Q1 and an SCR flip-flop formed by elements Q2 and Q3. With the supply voltage applied to the circuit, the timing capacitor CA charges the firing point of the PUT. The circuit applies and removes power from the leads 126 which are connected to the solenoid unit.

Figure 7:
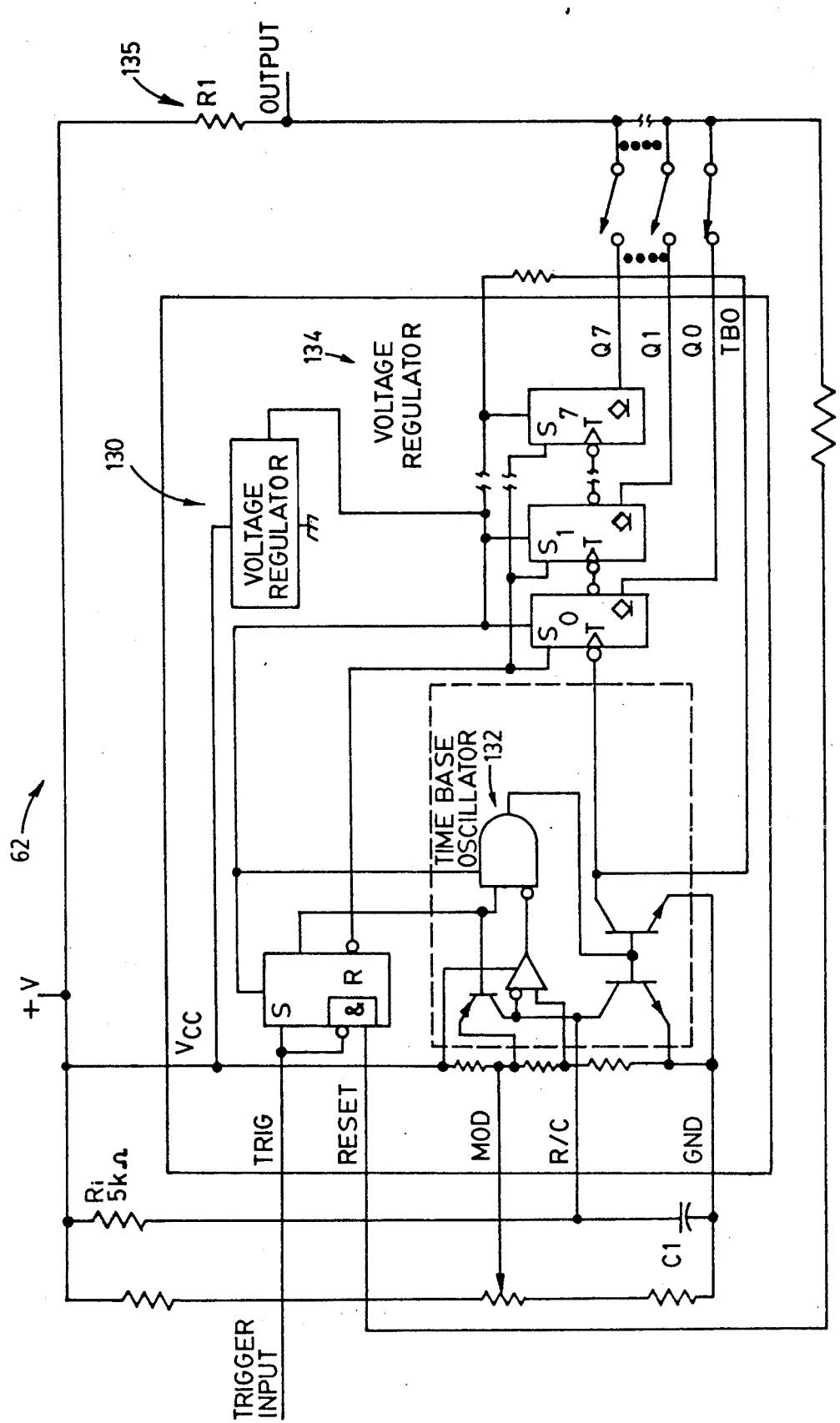
FIG. 7 is a circuit diagram of a delay circuit.

Upon activation of the noise generator unit, the delay circuit 62 is also activated. The delay circuit 62 is shown in FIG. 7, and is a programmable voltage controlled timer circuit that includes a voltage regulator 130 and a time base oscillator 132 as well as a voltage regulator 134. The time base oscillator has an open-collector output that is connected to the regulator output via a pull-up resistor 135. The output of the time base oscillator drives the input to an eight stage counter section. At start up, a positive trigger pulse starts the time base oscillator and sets all counter outputs to a low state. The outputs are open-collector stages that may be connected together to the pull-up resistor 135 to provide a "wired-OR" output function. This circuit may be used to generate a multiplicity of discrete time delays that are integer multiples of the time-base period. The total delay is the sum of the number of time-base periods, which is the binary sum of the Q outputs connected. Various time delays can be set using this circuit. The second delay circuit 70 is similar to the circuit 62 and thus will not be discussed.

Figure 8:
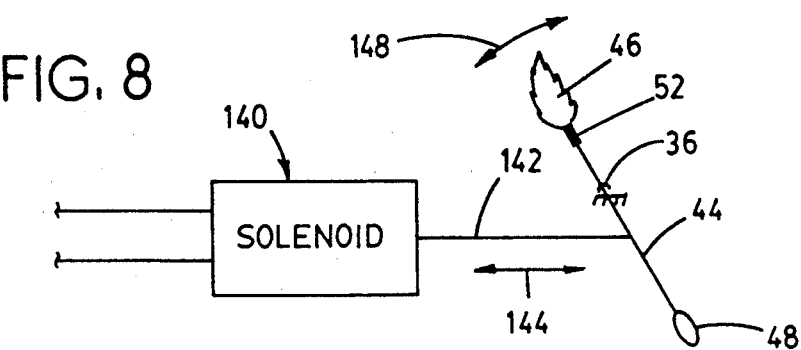
FIG. 8 is a block diagram illustrating a movement generator unit.
Figure 9:
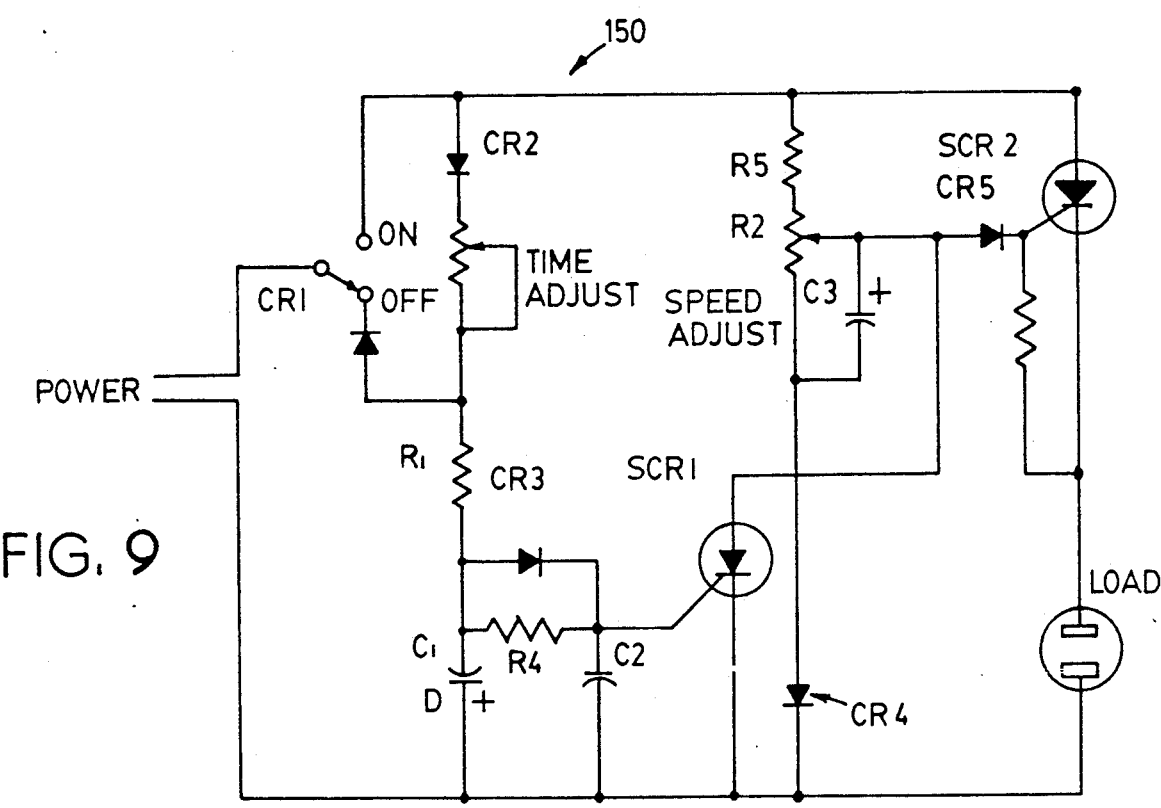
FIG. 9 is a diagram of a timer circuit used to turn off a unit connected after a predetermined period of operation.

The movement generator unit 38 is indicated in FIG. 8 as including a solenoid unit 140 that has a rod 142 that is moved in the directions indicated by double-headed arrow 144 as power is applied and removed from the solenoid 140 by a circuit such as circuit 124. The solenoid rod 142 is connected to the pendulum rod 44 to rock that rod 44 back and fourth about the pivot pin 36 as indicated by the double-headed arrow 148. This simulates a wagging of a tail. The time of operation of the solenoid 140, like the time of operation of the noise generator unit 50, is controlled by a circuit similar to the circuit 150 shown in FIG. 9. In the circuit 150, when the set time delay expires, SCR1 conducts and removes the gate signal from SCR2 which stops the operation of the associated unit. The circuit 150 also includes potentiometers that are used to adjust the time delay, and the value of the capacitor C1 can be adjusted to adjust the time delay if suitable.

After the delay periods set by the delay circuits, the scent generator unit 52 is activated to emit a scent, such as a doe deer in estrus, pine, cedar, apple, rabbit, corn, grape or the like as is well known to those skilled in the art.

Figure 10:
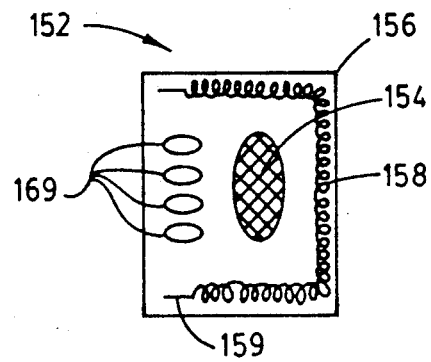
FIG. 10 illustrates a scent distributing unit.

The scent generator unit is indicated in FIG. 10 as including a porous material 154 that is mounted on base 156 adjacent to an electrical resistance heating element 158. Power is applied to the heating element via the above-discussed circuit elements via leads, such as lead 159, and the porous material is saturated with scent-producing material which is evaporated therefrom. The fumes of the heated material are dispersed via dispersal holes 160. The base 152 is flexible, and the scent generator unit 52 is mounted on the base 18.

It is understood that while certain forms of the present invention have been illustrated and described herein, it is not to be limited to the specific forms or arrangements of parts described and shown.

I claim:

1. An apparatus for attracting deer comprising:
    (A) a frame unit which includes
        (1) a base,
        (2) a support trunnion mounted on said base,
        (3) a pendulum element pivotally mounted on said support trunnion and including
            (a) a rod pivotally attached to said support trunnion near a top end of said support trunnion,
            (b) a deer tail simulating element on one end of said rod,
            (c) a counterweight on another end of said rod, and
        (4) mounting means on said base for affixing said base to a support;
    (B) a power unit mounted on said base;
    (C) a remote controlled switch unit connected to said power unit;
    (D) a noise generator unit mounted on said base and connected to said remote controlled switch to be activated when said remote controlled switch is closed;
    (E) a first delay circuit means connected to said noise generator unit to be started when said noise generator unit is activated and which is connected to said power unit and which delays application of power to other elements by a preset time interval;
    (F) a first timer circuit means connected to said noise generator unit to stop said noise generator unit after a first predetermined time period;
    (G) a movement generator unit connected to said pendulum element to pivotally move said pendulum element when activated and electrically connected to said first delay circuit means to be activated after said preset time interval;
    (H) a second timer circuit means connected to said movement generator unit to stop said movement generator unit after a second predetermined time period;
    (I) a second delay circuit means connected to said movement generator unit to be started when said movement generator unit is activated and which is also connected to said power unit and which delays application of power to further elements by a second preset time interval; and
    (J) a scent distributing unit connected to said second delay circuit means to be started after said second preset time interval.

2. The apparatus for attracting deer defined in claim 1 wherein said power unit includes a battery pack.

3. The apparatus for attracting deer defined in claim 1 wherein said noise generator unit includes a solenoid having a solenoid arm, said solenoid being of a type which moves said arm one way upon application of electrical power to said solenoid unit and which moves said arm in another direction when electrical power is removed from said solenoid unit, a scraper element attached to said solenoid arm for movement therewith, and a sounding board in engagement with said scraper element.

4. The apparatus for attracting deer defined in claim 3 wherein said movement generator unit includes a second solenoid having a second solenoid arm, said second solenoid being of a type which moves said second solenoid arm one way upon application of electrical power to said second solenoid unit and which moves said second solenoid arm in another direction when electrical power is removed from said second solenoid unit, said second solenoid arm being attached to said pendulum element rod.

5. The apparatus for attracting deer defined in claim 4 wherein said scent generator unit includes a base mounted on said pendulum element rod, a porous pad mounted on said unit base and adapted to be saturated with scented liquid, an electrical resistance heater element mounted on said scent generator unit base adjacent to said porous pad, and scent distributing outlet means in fluid connection with said porous pad.

6. The apparatus for attracting deer defined in claim 5 wherein said remote controlled switch includes a triac circuit element and a transformer.

7. The apparatus for attracting deer defined in claim 6 wherein said remote controlled switch further includes a capacitor and an SCR.

8. The apparatus for attracting deer defined in claim 7 wherein said first and second delay circuit means each includes a programmable voltage controlled timer.

9. The apparatus for attracting deer defined in claim 8 wherein said first and second timer circuit means each includes an SCR.

10. The apparatus for attracting deer defined in claim 9 wherein said noise generator unit and said movement generator unit each includes an on/off circuit means.

11. The apparatus for attracting deer defined in claim 10 wherein said on/off circuit means each includes a relaxation oscillator.

* * * * *